United States Patent
Hashimoto

(10) Patent No.: US 11,063,505 B2
(45) Date of Patent: Jul. 13, 2021

(54) MOTOR CONTROL APPARATUS EQUIPPED WITH BOOSTING UNIT

(71) Applicant: FANUC CORPORATION, Yamanashi (JP)

(72) Inventor: Shoutarou Hashimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/594,076

(22) Filed: Oct. 7, 2019

(65) Prior Publication Data

US 2020/0153325 A1 May 14, 2020

(30) Foreign Application Priority Data

Nov. 14, 2018 (JP) .............................. JP2018-214124

(51) Int. Cl.
*H02P 27/08* (2006.01)
*H02K 47/02* (2006.01)
*H02P 6/08* (2016.01)
*H02P 27/04* (2016.01)

(52) U.S. Cl.
CPC .............. *H02K 47/02* (2013.01); *H02P 6/08* (2013.01); *H02P 27/04* (2013.01); *H02P 2201/09* (2013.01)

(58) Field of Classification Search
CPC . H02K 47/02; H02P 6/08; H02P 27/04; H02P 2201/09
See application file for complete search history.

(56) References Cited

U.S. PATENT DOCUMENTS

| 2016/0226427 A1* | 8/2016 | Sakai ...................... H02P 27/08 |
| 2017/0288578 A1* | 10/2017 | Kanamori ........... H02M 1/4225 |
| 2019/0312510 A1* | 10/2019 | Tanaka ................ F24F 1/00073 |

FOREIGN PATENT DOCUMENTS

| JP | H1132496 A | 2/1999 |
| JP | 200464830 A | 2/2004 |
| JP | 200512856 A | 1/2005 |
| JP | 2007-151251 A | 6/2007 |
| JP | 2010110172 A | 5/2010 |
| JP | 201469255 A | 4/2014 |

* cited by examiner

*Primary Examiner* — Muhammad S Islam
(74) *Attorney, Agent, or Firm* — Hauptman Ham, LLP

(57) ABSTRACT

A motor control apparatus includes: a converter configured to convert AC voltage input from an AC power supply side into DC voltage, and then output the DC voltage to a DC side; an inverter configured to convert DC voltage input from the DC side into AC voltage for driving a motor, and then output the AC voltage; and a boosting unit configured to step up DC voltage input to the inverter from the DC side, according to a deviation between a speed command to the motor and speed information acquired from the motor.

9 Claims, 14 Drawing Sheets

MOTOR CONTROL APPARATUS EQUIPPED WITH BOOSTING UNIT

RELATED APPLICATIONS

The present application claims priority of Japanese Application Number 2018-214124, filed Nov. 14, 2018, the disclosure of which is hereby incorporated by reference herein in its entirety.

BACKGROUND OF THE INVENTION

1. Field of Invention

The present invention relates to a motor control apparatus equipped with a boosting unit.

2. Description of the Related Art

In a motor control apparatus which controls driving of motors in a machine tool, forging machinery, an injection molding machine, industrial machinery, or various robots, AC voltage input from an AC power supply side is converted into DC voltage by a converter (a rectifier) and then output to a DC link, the DC voltage in the DC link is further converted into AC voltage by an inverter, and then such AC voltage is supplied to a motor provided for each drive axis as drive voltage. The "DC link" refers to a circuit portion which electrically connects a DC output side of a converter and a DC input side of an inverter to each other, and sometimes, is also otherwise referred to as a "DC link portion", a "direct-current link", a "direct-current link portion", a "direct-current intermediate circuit", or the like.

A PWM inverter which supplies drive power to a motor in a motor control apparatus includes a bridge circuit of a semiconductor switching element and a diode connected in antiparallel with the semiconductor switching element, and converts input DC voltage into AC voltage, and then outputs the AC voltage. According to a PWM control method, a voltage command of each phase is compared with a carrier frequency of triangular waves in a current controller inside the motor control apparatus, and each semiconductor switching element inside the bridge circuit constituting the inverter is turned on or off, depending on a magnitude relation between the voltage command and the carrier frequency. Due to a principle of such a PWM control method, actual AC voltage output from an inverter becomes smaller than AC voltage originally scheduled based on a voltage command.

Particularly, the higher a PWM frequency is, the greater a difference between actual AC voltage output from an inverter and AC voltage originally scheduled based on a voltage command becomes.

Furthermore, when AC-power-supply-side AC voltage of a converter decreases, DC voltage output by the converter decreases, and actual AC voltage output by an inverter also decreases accordingly. In other words, actual AC voltage output from the inverter may become smaller than AC voltage originally scheduled based on a voltage command, due to a voltage degrease on an AC power supply side.

In this way, when actual AC voltage output from the inverter becomes smaller than voltage originally scheduled based on a voltage command, for some reason such as a reason of a principle of the PWM control method or an AC-power-supply-side voltage decrease, output and torque of a motor become lower than desired values. For instance, when a high load is applied to the motor, speed of the motor decreases.

For example, when a motor is an induction motor, input voltage $V_1$ to the induction motor can be represented as in Equation 1 in which a current flowing into the induction motor is $I_1$, primary resistance is $R_1$, a primary magnetic flux is $\Phi_1$, and a primary frequency is $\omega$.

[Equation 1]

$$V_1 = R_1 I_1 + \frac{d}{dt}\varphi_1 + \omega J \varphi_1 \qquad (1)$$

In Equation 1, J is represented as in Equation 2.

[Equation 2]

$$J = \begin{pmatrix} 0 & -1 \\ 1 & 0 \end{pmatrix} \qquad (2)$$

In Equation 1, "$R_1 I_1$" represents a voltage drop amount resulting from the primary resistance, "$d\varphi_1/dt$" represents magnetic-flux-varying electromotive force, and "$\omega J \varphi_1$" represents speed electromotive force.

For simplification, given that driving of the induction motor is in a steady state (i.e., $d\varphi_1/dt=0$), and that the induction motor is rotating at a certain degree of a constant speed, the speed electromotive force is considered to be sufficiently greater than a voltage drop resulting from the primary resistance, and therefore, Equation 1 can be approximated only by the speed electromotive force as represented in Equation 3.

[Equation 3]

$$V_1 = \omega J \varphi_1 = \omega L_1 \begin{pmatrix} -\sigma i_{1q} \\ i_{1d} \end{pmatrix} \qquad (3)$$

Herein, $i_1$ in Equation 3 can be represented as in Equation 4.

[Equation 4]

$$i_1 = \begin{pmatrix} -i_d \\ i_{1q} \end{pmatrix} \qquad (4)$$

Furthermore, σ in Equation 3 is a leakage coefficient, and can be represented as in Equation 5 in which mutual inductance of the induction motor is M, primary inductance is $L_1$, and secondary inductance is $L_2$.

[Equation 5]

$$\sigma = 1 - \frac{M^2}{L_1 L_2} \qquad (5)$$

From Equation 3, it is seen that the primary frequency ω or primary current $i_1$ decreases when the input voltage $V_1$ to the induction motor decreases. The decrease of the primary frequency ω causes a decrease in the speed of the induction motor.

When the number of pairs of poles in the induction motor is Np, primary q-phase current is $i_{1q}$, and a secondary d-phase magnetic flux is $\varphi_{2d}$, torque τ of the induction motor can be represented as in Equation 6.

[Equation 6]

$$\tau = 3N_p \frac{M}{L_2} \varphi_{2d} i_{1q} \qquad (6)$$

From Equation 6, it is seen that the torque t decreases when the primary current $i_1$ decreases. Application of a high load to the induction motor when the torque τ decreases leads to a decrease in the speed of the induction motor.

When the induction motor is driven by vector control, and in this case, AC voltage output from an inverter becomes smaller than voltage scheduled by a voltage command due to the principle of the PWM control method, actual current flowing in the induction motor is also decreased.

For example, as described in Japanese Unexamined Patent Publication No. 2007-151251, there is known a motor control apparatus including: a boosting circuit which steps up power supply voltage, and then outputs the stepped-up power supply voltage; a drive circuit which supplies a motor with drive power based on the stepped-up output voltage; and a control method which controls actuation of the boosting circuit, wherein actuation control of the drive circuit is performed, based on a deviation between an actual current value passed to the motor and a current command value, and the control method controls actuation of the boosting circuit in order to gradually decrease the output voltage when the deviation is less than or equal to a predetermined threshold.

SUMMARY OF INVENTION

For example, when an induction motor is driven by vector control, and in this case, AC voltage output from an inverter becomes smaller than voltage originally scheduled by a voltage command due to a principle of a PWM control method, actual current flowing into the induction motor from the inverter is decreased.

Moreover, for example, regardless of whether a motor controlled by a motor control apparatus is an induction motor or a synchronous motor, actual AC voltage output from the inverter becomes smaller than AC voltage originally scheduled based on a voltage command, due to an AC-power-supply-side voltage decrease in a converter, and actual current flowing into the induction motor from the inverter is decreased. In such a case, a current control unit in the motor control apparatus performs control of outputting a voltage command of a greater value in order to cause actual current to follow a current command. However, in the current control unit, an upper limit value is generally set for a voltage command for the purpose of protecting a motor or an inverter. When a voltage command reaches an upper limit value in the current control unit, control of causing actual current to follow a current command may not be performed. As a result, a state where AC voltage and AC current output from the inverter become smaller than values scheduled by the voltage command and the current command continues, and motor output and torque become smaller than desired values. In such a state, application of a high load to the motor leads to a decrease in the speed of the motor. Therefore, there has been desired a motor control apparatus capable of avoiding a decrease in the speed of a motor resulting from unexpected decreases in motor output and torque.

According to one aspect of the present disclosure, a motor control apparatus includes a converter configured to convert AC voltage input from an AC power supply side into DC voltage, and then output the DC voltage to a DC side; an inverter configured to convert DC voltage input from the DC side into AC voltage for driving a motor, and then output the AC voltage; and a boosting unit configured to step up DC voltage input to the inverter from the DC side, according to a deviation between a speed command to the motor and speed information acquired from the motor.

BRIEF DESCRIPTION OF THE DRAWINGS

The present invention will be more clearly understood with reference to the following accompanying drawings.

DETAILED DESCRIPTION

A motor control apparatus equipped with a boosting unit is described below with reference to the drawings. The drawings use different scales as appropriate for ease of understanding. A mode illustrated in each drawing is one example for implementing the present invention, and the present invention is not limited to illustrated embodiments.

First, a motor control apparatus according to a first embodiment of the present disclosure is described. In the first embodiment, DC voltage input to an inverter is stepped up according to a deviation between a speed command to a motor and an actual speed of the motor.

Figure 1:
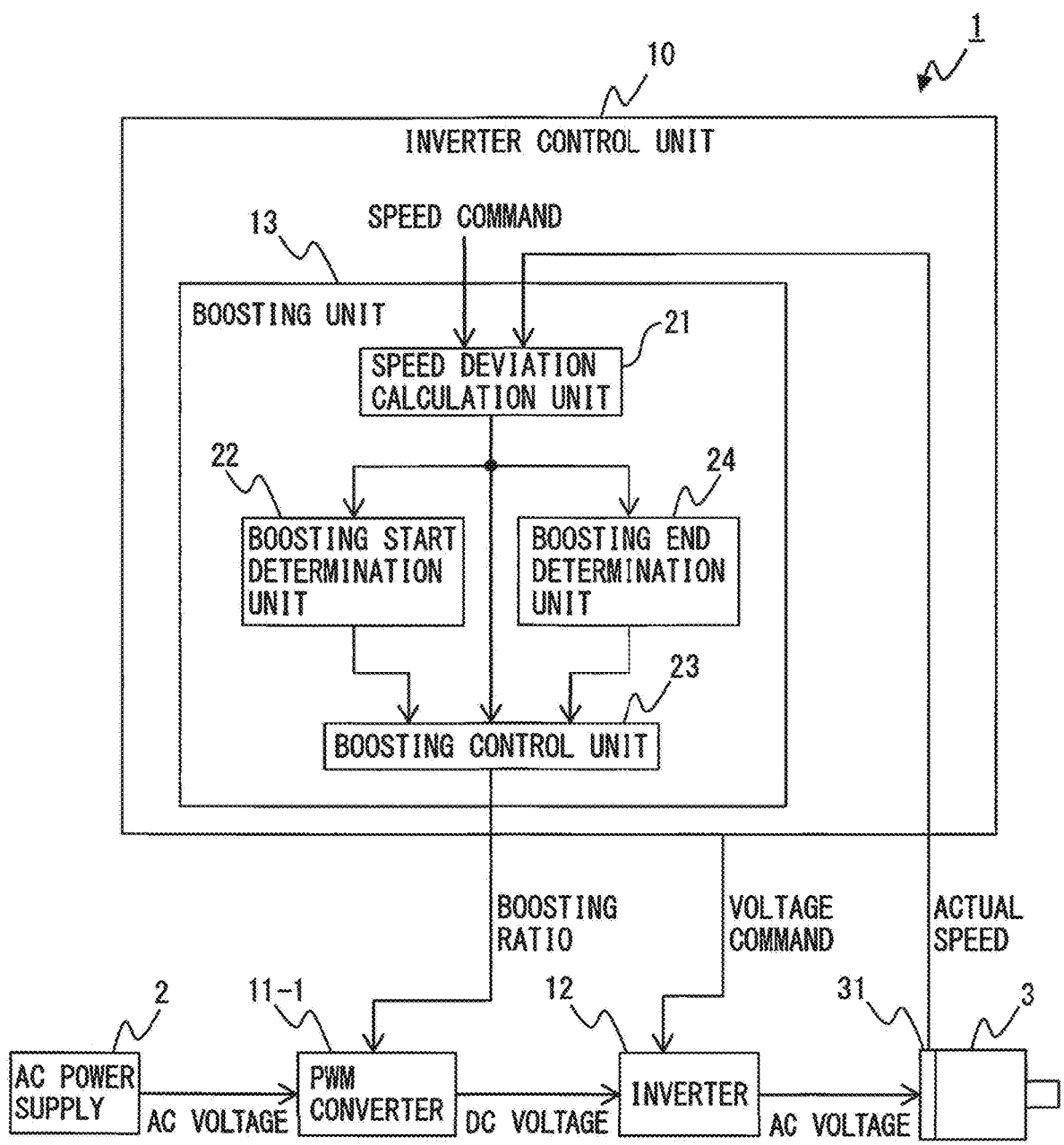
FIG. 1 is a diagram illustrating a motor control apparatus according to a first embodiment of the present disclosure.

FIG. 1 is a diagram illustrating the motor control apparatus according to the first embodiment of the present disclosure.

As one example, a case where an AC motor (hereinafter, briefly referred to as a "motor") 3 is controlled by a motor control apparatus 1 connected to an AC power supply 2 is illustrated. Note that, in the first embodiment, a kind of motor 3 is not particularly limited, and the motor 3 may be either, for example, an induction motor or a synchronous motor. Moreover, the number of phases of each of the AC power supply 2 and the motor 3 does not particularly limit the present embodiment, and may be, for example, three phases or a single phase. A three-phase AC 400 V power supply, a three-phase AC 200 V power supply, a three-phase AC 600 V power supply, a single-phase AC 100 V power supply, or the like is cited as one example of the AC power supply 2. Machines provided with the motor 3 include, e. g., a machine tool, a robot, forging machinery, an injection molding machine, industrial machinery, various electrical appliances, an electric train, an automobile, and an aircraft.

As illustrated in FIG. 1, the motor control apparatus 1 according to the present embodiment includes a PWM converter 11-1, an inverter 12, and a boosting unit 13. Further, as in a general motor control apparatus, the motor control apparatus 1 includes an inverter control unit 10.

The PWM converter 11-1 converts AC voltage input from an AC power supply side into desired intensity of DC voltage by a switching operation of an internal semiconductor switching element, and then outputs the DC voltage to a DC side. The PWM converter 11-1 includes a bridge circuit of a semiconductor switching element and a diode connected in antiparallel with the semiconductor switching element, and performs voltage conversion between AC voltage on the AC power supply 2 side and DC-side DC voltage by on/off control of each semiconductor switching element according to a received voltage command based on PWM control. Moreover, there is an advantage that the PWM converter 11-1 can step up, with a power factor of substantially 1, DC-side DC voltage to any voltage equal to or more than a wave height value of AC voltage input from the AC power supply 2 side. In other words, DC voltage in a DC link can be adjusted to a desired value by controlling a boosting ratio (a voltage rise ratio when referenced to normal DC output of the PWM converter 11-1) in a voltage conversion operation of the PWM converter 11-1. The PWM converter 11-1 is configured as a three-phase bridge circuit when the AC power supply 2 has three phases, and the PWM converter 11-1 is configured by a single-phase bridge circuit when the AC power supply 2 has a single phase. Although examples of the semiconductor switching element provided in the PWM converter 11-1 include an FET, an IGBT, a thyristor, a gate turn-off thyristor (GTO), silicon carbide (SiC), a transistor, and the like, a type of semiconductor switching element itself does not limit the present embodiment, and the semiconductor switching element may be another semiconductor switching element.

A DC output side of the PWM converter 11-1 and a DC input side of the inverter 12 are connected to each other via the DC link. The "DC link" is sometimes otherwise referred to as a "DC link portion", a "direct-current link", a "direct-current link portion", a "direct-current intermediate circuit", or the like. Although a DC link capacitor is provided in the DC link, illustration of the DC link capacitor is omitted in FIG. 1. The DC link capacitor has a function of storing energy (DC power) in the DC link, and a function of suppressing a pulsation component of output on a DC side of the PWM converter 11-1. The DC link capacitor is charged with a charge to store DC power in the DC link. Examples of the DC link capacitor provided in the DC link include, for example, an electrolytic capacitor, a film capacitor, and the like.

The inverter 12 converts the DC voltage (i.e., DC voltage in the DC link) input from the DC side into AC voltage for driving the motor 3, and then outputs the AC voltage to the motor 3. The inverter 12 has only to have a configuration being capable of converting DC power into AC power, and includes, for example, a PWM inverter equipped with a semiconductor switching element therein, or the like. The inverter 12 is configured as a three-phase bridge circuit when the motor 3 is a three-phase AC motor, and the inverter 12 is configured as a single-phase bridge circuit when the motor 3 is a single-phase motor. When receiving a voltage command from the inverter control unit 10, the inverter 12 converts DC voltage in the DC link into AC voltage for driving the motor, and then outputs the AC voltage to the motor 3, and at the time of motor regeneration, the inverter 12 converts AC voltage regenerated in the motor 3 into DC voltage and then returns the DC voltage to the DC link side. When the inverter 12 is configured by a PWM inverter, the inverter 12 is composed of a bridge circuit of a semiconductor switching element and a diode connected in antiparallel with the semiconductor switching element. In this case, although examples of the semiconductor switching element include an FET, an IGBT, a thyristor, a gate turn-off thyristor (GTO), silicon carbide (SiC), a transistor, and the like, a type of semiconductor switching element itself does not limit the present embodiment, and the semiconductor switching element may be another semiconductor switching element.

As in a general motor control apparatus, the inverter control unit 10 controls the inverter 12 which performs power conversion between DC voltage in the DC link and AC voltage being drive voltage or regenerative voltage of the motor 3. In other words, the inverter control unit 10 generates, in accordance with a PWM control method, a voltage command for controlling a speed and torque of the motor 3, or a position of a rotor, based on an actual speed (speed feedback) of the motor 3 detected by a speed sensor 31, current (current feedback) flowing in a winding of the motor 3, a predetermined torque command, an operation program of the motor 3, and the like. A voltage conversion operation by the inverter 12 is controlled, based on a voltage command generated by the inverter control unit 10.

The inverter control unit 10 may be built, for example, in a form of a software program, or may be built by a combination of various electronic circuits and a software program. For example, when these components are each built in a form of a software program, a function of each of the above-described units may be implemented by causing an arithmetic processing device such as a DSP or an FPGA present in the motor control apparatus 1 to operate in accordance with the software program.

Alternatively, the inverter control unit 10 may be implemented as a semiconductor integrated circuit on which a software program implementing a function of each unit is written. Further, the inverter control unit 10 may be provided inside, for example, a numerical control apparatus of a machine tool.

The boosting unit 13 steps up DC voltage input to the inverter 12 from the DC link being the DC side, according to a deviation between a speed command to the motor 3 and speed information acquired from the motor 3. As described above, when actual AC voltage output from the inverter 12 becomes smaller than AC voltage originally scheduled based on a voltage command, desired motor output and torque may not be acquired. In this instance, application of a high load to the motor 3 leads to a decrease in the speed of the motor. Thus, the boosting unit 13 steps up DC voltage input to the inverter 12 from the DC link being the DC side, when a deviation between a speed command to the motor 3 and speed information acquired from the motor 3 is more than a prescribed first threshold. Thereby, a speed decrease of the motor 3 at the application of a high load to the motor 3 is avoided.

When a speed command received by the boosting unit 13 is neither an acceleration command nor a deceleration command (i.e., a speed command is a constant speed command), but a decrease in an actual speed of the motor 3 continues, it is considered that a high load is applied to the motor 3. For example, a deviation between a speed command to the motor 3 and an actual speed of the motor 3 widens when an actual speed of the motor 3 decreases, and therefore, a current control unit (not illustrated) inside the inverter control unit 10 comes to output a voltage command having a greater value in order to cause the actual speed to follow the speed command. In the current control unit, an upper limit value is generally set for a voltage command for the purpose of protecting the motor 3 or the inverter 12, and when a voltage command reaches the upper limit value in the current control unit, control of causing actual current to follow a current command may not be performed. As a result, a state where AC voltage and AC current output from the inverter 12 become smaller than values originally scheduled by the voltage command and the current command continues. Application of a high load to the motor 3 in this state leads to a decrease in the speed of the motor. Thus, the boosting unit 13 performs the above-described boosting operation when a deviation between a speed command to the motor 3 and speed information acquired from the motor 3 is more than a first threshold.

Note that, even in such a transitional state that a speed command to the motor 3 is either an acceleration command or a deceleration command, a deviation between a speed command to the motor 3 and an actual speed of the motor 3 may become great. A deviation between a speed command and an actual speed in this transitional state related to motor acceleration and deceleration is independent of a speed decrease of the motor resulting from unexpected decreases in motor output and torque. Accordingly, when a speed command to the motor 3 is neither an acceleration command nor a deceleration command (i.e., when the motor is not accelerated or decelerated), the boosting unit 13 preferably performs the above-described boosting operation. On the other hand, during a transitional state in which a speed command to the motor 3 is either an acceleration command or a deceleration command, the boosting unit 13 does not perform the above-described boosting operation, and maintains input of DC voltage in the current state for the inverter 12.

In order to more certainly find out a state in which a speed command is neither an acceleration command nor a deceleration command, the boosting unit 13 may receive a speed command to the motor 3 from the inverter control unit 10, and define, as one condition of a boosting operation by the boosting unit 13, the fact that the received speed command is neither an acceleration command nor a deceleration command (i.e., a speed command is a constant speed command). In other words, when a condition that "a deviation between a speed command to the motor 3 and speed information acquired from the motor 3 is more than the first threshold" and that "a received speed command is neither an acceleration command nor a deceleration command (i.e., a speed command is a constant speed command)" is satisfied, the boosting unit 13 may step up DC voltage input to the inverter 12 from the DC link being the DC side.

Details of a relation between a deviation between a speed command and an actual speed, and a boosting ratio during a boosting operation, and relation between a deviation and a threshold will be described later.

In the first embodiment, speed information of the motor 3 is an actual speed of the motor 3 detected by the speed sensor 31. An actual speed of the motor 3 detected by the speed sensor 31 is input to the inverter control unit 10, and, in the inverter control unit 10, used for a voltage command for controlling a speed and torque of the motor 3, or a position of a rotor. Thus, providing the boosting unit 13 inside the inverter control unit 10, for example, as illustrated in FIG. 1 is advantageous in terms of cost and space. As a modification example of this, the boosting unit 13 may be provided separately from the inverter control unit 10, or may be provided inside, for example, a numerical control apparatus of a machine tool, as described later. In either case, the boosting unit 13 may be built, for example, in a form of a software program, or may be built by a combination of various electronic circuits and a software program. For example, when these components are each built in a form of a software program, a function of each of the above-described units may be implemented by causing an arithmetic processing device such as a DSP or an FPGA present in the motor control apparatus 1 to operate in accordance with the software program. Alternatively, the boosting unit 13 may be implemented as a semiconductor integrated circuit on which a software program implementing a function of each unit is written.

As described above, since the PWM converter 11-1 can step up DC-side DC voltage to desired voltage equal to or more than a wave height value of AC voltage input from the AC power supply 2 side, the boosting unit 13 can step up DC voltage output from the DC side of the PWM converter 11-1 and then input to the inverter 12, by controlling a switching operation of the semiconductor switching element inside the PWM converter 11-1.

In order to control a boosting operation of the PWM converter 11-1, the boosting unit 13 includes a speed deviation calculation unit 21, a boosting start determination unit 22, a boosting control unit 23, and a boosting end determination unit 24.

The speed deviation calculation unit 21 calculates a deviation between a speed command to the motor 3 and speed information acquired from the motor 3. A speed command to the motor 3 is acquired from the inverter control unit 10. Moreover, in the first embodiment, speed information acquired from the motor 3 is an actual speed of the motor 3 detected by the speed sensor 31.

The boosting start determination unit 22 determines whether or not a deviation calculated by the speed deviation calculation unit 21 is more than the prescribed first threshold. Note that, when a deviation calculated by the speed deviation calculation unit 21 is more than the first threshold, the boosting control unit 23 described later controls the PWM converter 11-1 in such a way as to perform a boosting operation, and therefore, heat generation is expected in the PWM converter 11-1, the inverter 12, the motor 3, peripheral equipment thereof, and the like. Thus, a first threshold has only to be set in consideration of, for example, a balance between permissible decreases in output and torque of the motor 3 and permissible heat generation. For example, when priority is given to reduction of heat generation, the first threshold has only to be set to a slightly less threshold, and when priority is given to avoidance of decreases in output and torque of the motor 3 (i.e., a speed decrease of the motor 3), the first threshold has only to be set to a slightly great threshold. Moreover, a second threshold used in processing in the boosting end determination unit 24 described later has only to be set to a value slightly smaller than the first threshold.

Further, by providing a difference (i.e., providing hysteresis) between the first threshold and the second threshold, it is possible to prevent start and end of a boosting operation from occurring too frequently due to oscillation (fluctuation) of a deviation between a speed command to the motor 3 and an actual speed of the motor 3. Specific numerical values of the first threshold and the second threshold have only to be suitably set in consideration of actual various parameters (voltage, current, and speeds) for each component (including the PWM converter 11-1 and the inverter 12) of the motor control apparatus 1, the motor 3, and other peripheral equipment.

The boosting end determination unit 24 determines whether or not a deviation calculated by the speed deviation calculation unit 21 is less than the prescribed second threshold that is smaller than the first threshold, after the boosting start determination unit 22 determines that the deviation is more than the first threshold.

When the deviation calculated by the speed deviation calculation unit 21 is more than the first threshold as a result of the determination by the boosting start determination unit 22, the boosting control unit 23 steps up DC voltage input to the inverter 12 from the DC side to DC voltage greater than that at the time before determined to be more than the first threshold by the boosting start determination unit 22. Moreover, when the deviation calculated by the speed deviation calculation unit 21 is less than the second threshold as a result of the determination by the boosting end determination unit 24, the boosting control unit 23 steps down DC voltage input to the inverter 12 from the DC side to DC voltage at the time before determined to be more than the first threshold by the boosting start determination unit 22. Since the PWM converter 11-1 can step up or step down DC-side DC voltage to desired voltage equal to or more than a wave height value of AC voltage input from the AC power supply 2 side, the boosting unit 13 can step up or step down DC voltage output from the DC side of the PWM converter 11-1 and then input to the inverter 12, by controlling a switching operation of the semiconductor switching element inside the PWM converter 11-1.

Figure 2:
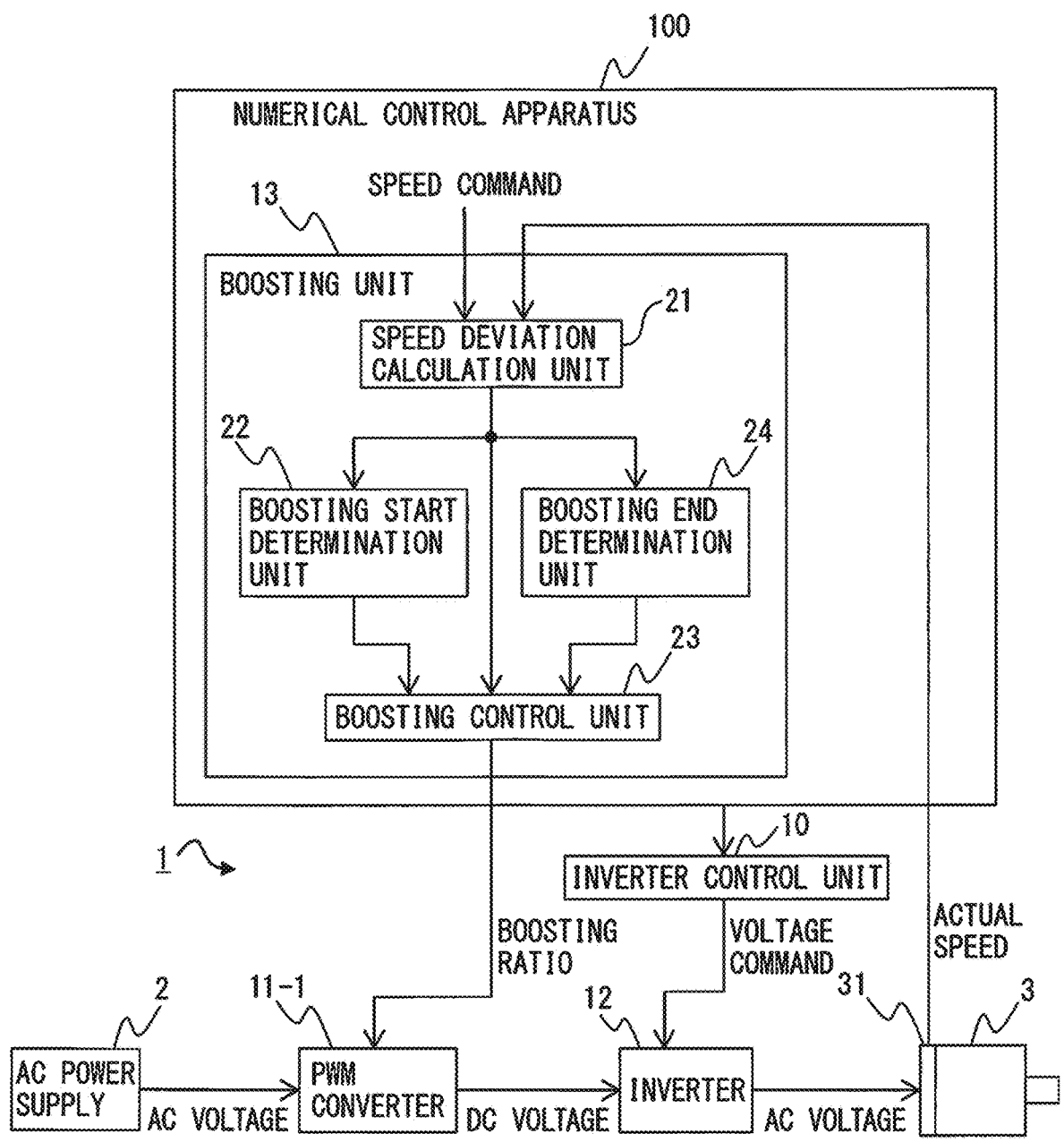
FIG. 2 is a diagram illustrating a modification example of the motor control apparatus according to the first embodiment of the present disclosure.

Note that the boosting unit 13 described with reference to FIG. 1 is provided inside the inverter control unit 10, but the boosting unit 13 may be provided separately from the inverter control unit 10. FIG. 2 is a diagram illustrating a modification example of the motor control apparatus according to the first embodiment of the present disclosure. As illustrated in FIG. 2, the boosting unit 13 may be provided inside a numerical control apparatus 100 of a machine tool, and provided separately from the inverter control unit 10.

Figure 3:
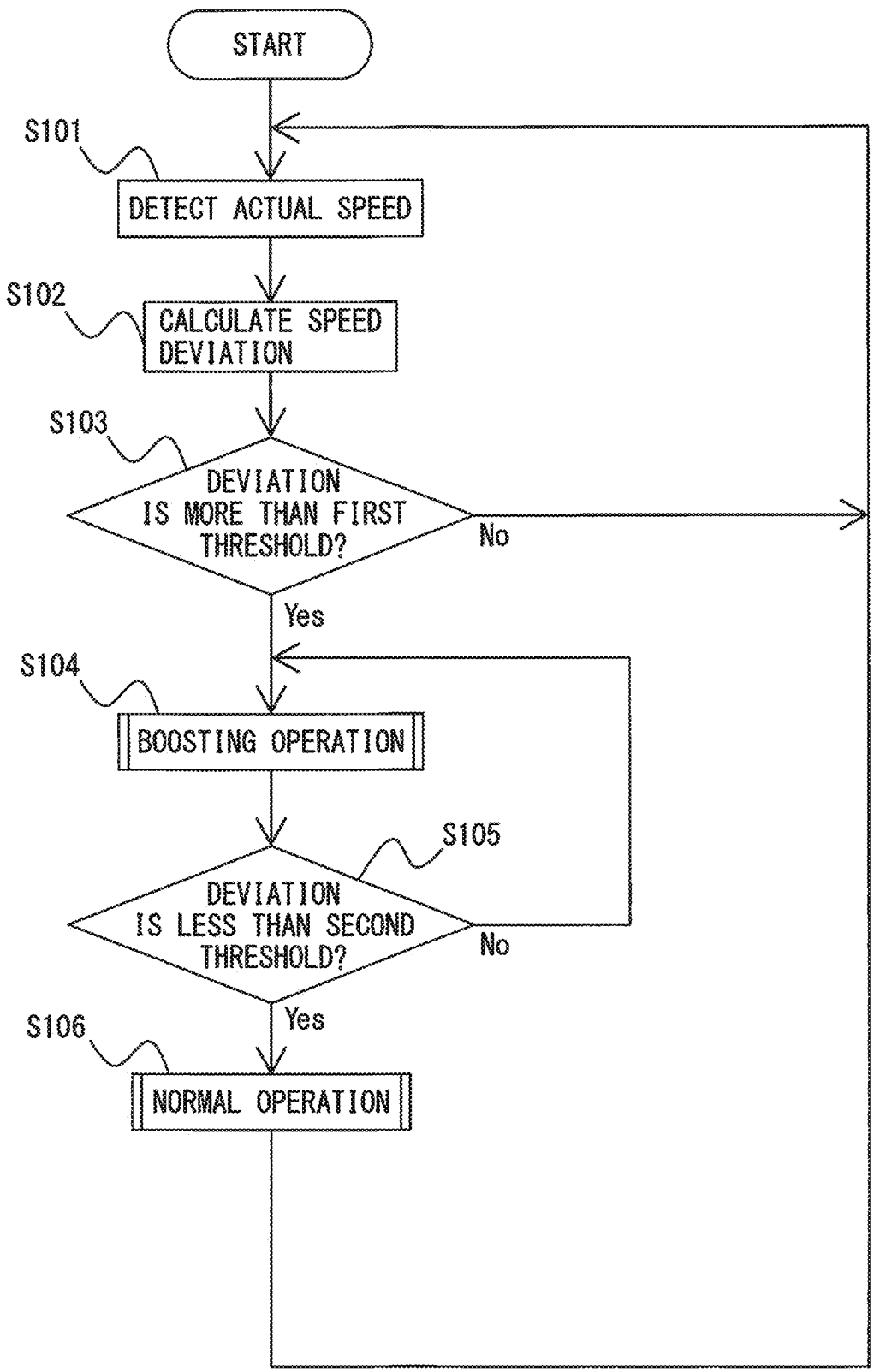
FIG. 3 is a flowchart illustrating an operation flow of the motor control apparatus according to the first embodiment of the present disclosure.

FIG. 3 is a flowchart illustrating an operation flow of the motor control apparatus according to the first embodiment of the present disclosure.

In a state where driving of the motor 3 is controlled by the motor control apparatus 1, the speed sensor 31 detects an actual speed of the motor 3, in Step S101.

In Step S102, the speed deviation calculation unit 21 calculates a deviation between a speed command to the motor 3 and the actual speed of the motor 3 detected by the speed sensor 31.

In Step S103, the boosting start determination unit 22 determines whether or not the deviation calculated by the speed deviation calculation unit 21 is more than the first threshold. The operation flow proceeds to Step S104 when it is determined in Step S103 that the deviation is more than the first threshold, whereas the operation flow returns to Step S101 when it is not determined that the deviation is more than the first threshold.

In Step S104, the boosting control unit 23 steps up DC voltage input to the inverter 12 from the DC side to DC voltage greater than that at the time before determined to be more than the first threshold by the boosting start determination unit 22.

In Step S105, the boosting end determination unit 24 determines whether or not the deviation calculated by the speed deviation calculation unit 21 is less than the second threshold. The operation flow proceeds to Step S106 when it is determined in Step S105 that the deviation is less than the second threshold, whereas the operation flow returns to Step S104 when it is not determined that the deviation is less than the second threshold.

In Step S106, the boosting control unit 23 steps down DC voltage input to the inverter 12 from the DC side to DC voltage at the time before determined to be more than the first threshold by the boosting start determination unit 22. Therefore, the DC voltage input to the inverter 12 returns to the value before boost.

Now, a circuit configuration of a motor control apparatus according to a second embodiment of the present disclosure is described. An induction motor or a synchronous motor can be performed vector control (sensorless vector control) without any speed sensor. The second embodiment can be applied to an induction motor (sensorless induction motor) having no such speed sensor, or a synchronous motor (sensorless synchronous motor) having no speed sensor. In the second embodiment, for example, speed information in the case of an induction motor is an estimated speed of the induction motor calculated, based on a value of actual current flowing into the induction motor or a current command to the induction motor, and a primary frequency command to the induction motor.

Figure 4:
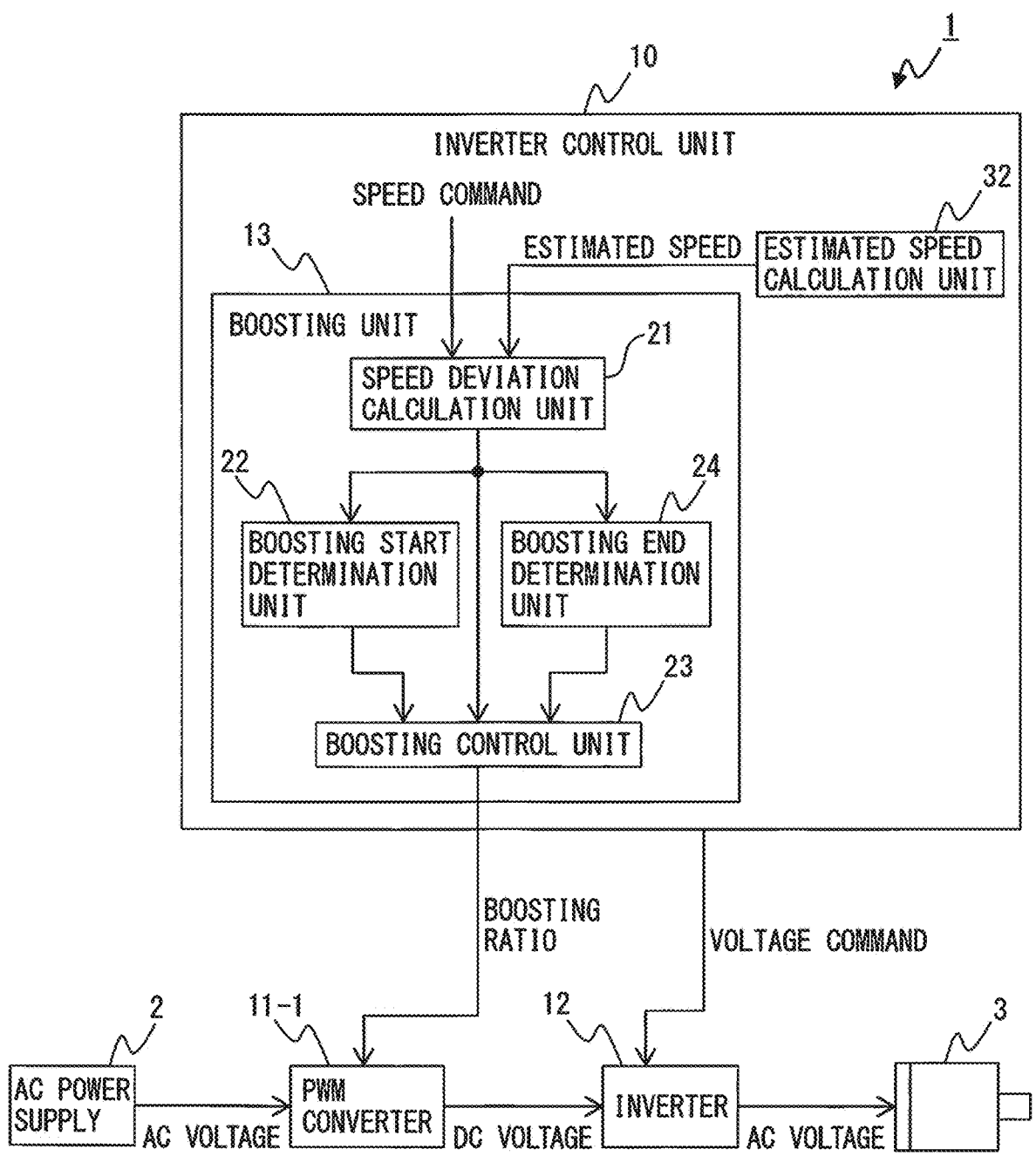
FIG. 4 is a diagram illustrating a motor control apparatus according to a second embodiment of the present disclosure.

FIG. 4 is a diagram illustrating the motor control apparatus according to the second embodiment of the present disclosure. Further, FIG. 5 is a diagram illustrating details of an inverter control unit illustrated in FIG. 4, and one example when a sensorless induction motor is controlled.

As one example, a case where a motor 3 is controlled by a motor control apparatus 1 connected to an AC power supply 2 is described. The motor 3 may be either an induction motor or a synchronous motor. Note that the number of phases of each of the AC power supply 2 and the motor 3 does not particularly limit the present embodiment, and may be, for example, three phases or a single phase. A three-phase AC 400 V power supply, a three-phase AC 200 V power supply, a three-phase AC 600 V power supply, a single-phase AC 100 V power supply, or the like is cited as one example of the AC power supply 2. Machines provided with the motor 3 include, e. g., a machine tool, a robot, forging machinery, an injection molding machine, industrial machinery, various electrical appliances, an electric train, an automobile, and an aircraft.

As illustrated in FIG. 4, the motor control apparatus 1 according to the present embodiment includes a PWM converter 11-1, an inverter 12, a boosting unit 13, and an estimated speed calculation unit 32.

Figure 5:
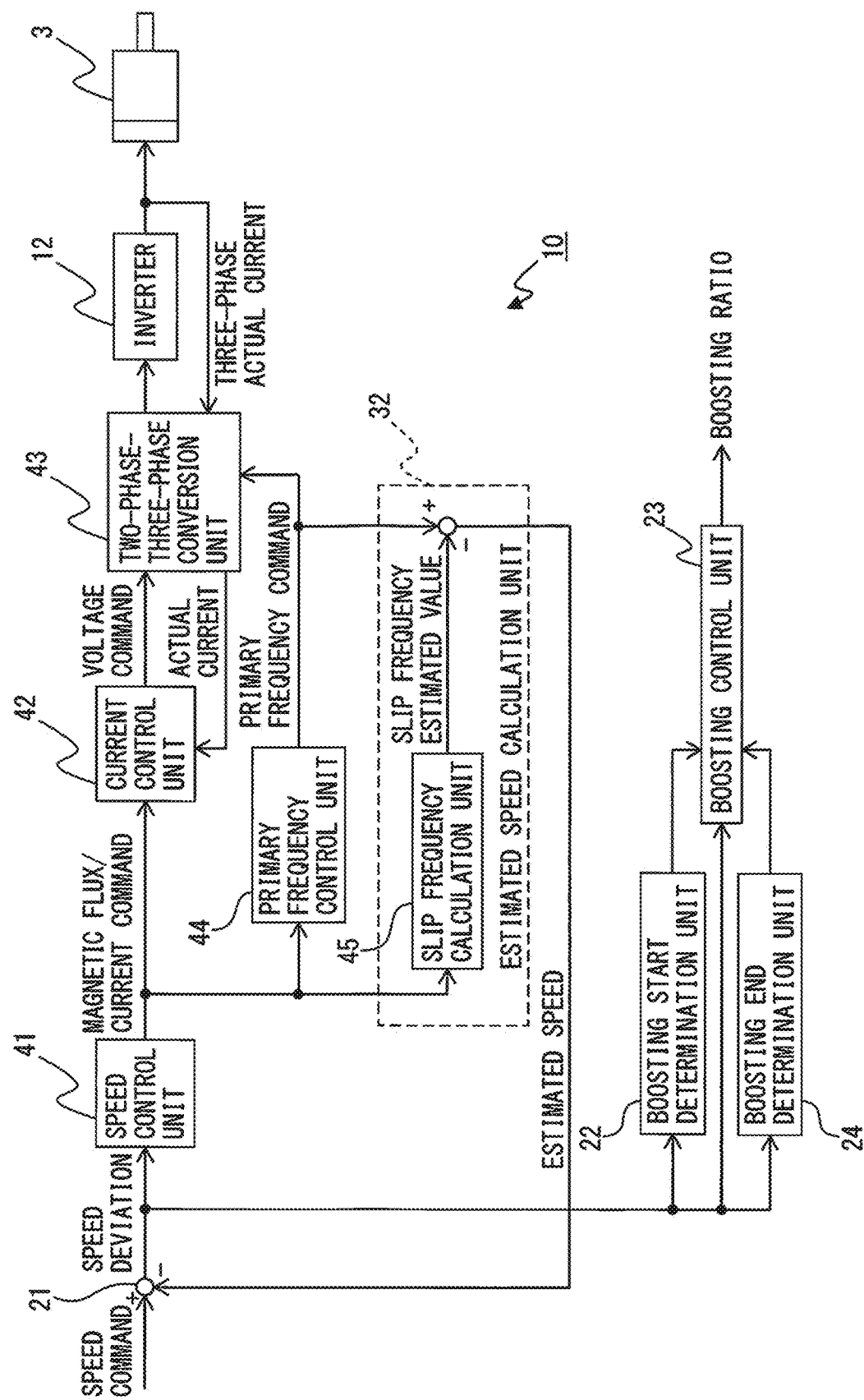
FIG. 5 is a diagram illustrating details of an inverter control unit illustrated in FIG. 4, and one example when a sensorless induction motor is controlled.

As illustrated in FIGS. 4 and 5, the estimated speed calculation unit 32 is provided in an inverter control unit 10. The estimated speed calculation unit 32 may be built, for example, in a form of a software program, or may be built by a combination of various electronic circuits and a software program. For example, when the estimated speed calculation unit 32 is built in a form of a software program, a function of each of the above-described units may be implemented by causing an arithmetic processing device such as a DSP or an FPGA provided inside the inverter control unit 10 in the motor control apparatus 1 to operate in accordance with the software program. Alternatively, the estimated speed calculation unit 32 may be implemented as a semiconductor integrated circuit on which a software program implementing a function of each unit is written.

The PWM converter 11-1 and the inverter 12 are as has been described with reference to FIG. 1, and therefore, a description is omitted. Note that the boosting unit 13 is provided inside the inverter control unit 10 in FIGS. 4 and 5, but may be provided separately from the inverter control unit 10, or may be provided inside, for example, a numerical control apparatus 100 of a machine tool.

As in a general motor control apparatus, the motor control apparatus 1 includes the inverter control unit 10. As described above, the inverter control unit 10 may be built, for example, in a form of a software program, or may be built by a combination of various electronic circuits and a software program. As illustrated in FIG. 5, in order to perform sensorless vector control of the motor 3 being an induction motor, the inverter control unit 10 includes a speed deviation calculation unit 21, a speed control unit 41, a current control unit 42, a two-phase-three-phase conversion unit 43, a primary frequency control unit 44, and a slip frequency calculation unit 45. The speed deviation calculation unit 21 in sensorless vector control is also used as a speed deviation calculation unit inside the boosting unit 13 in the present embodiment. Moreover, the slip frequency calculation unit 45 in sensorless vector control is also used as part of a function of the estimated speed calculation unit 32 inside the boosting unit 13 in the present embodiment.

In slip-frequency-control-type sensorless vector control of an induction motor, the primary frequency control unit 44 generates a primary frequency command, based on a magnetic flux command and a current command generated by the speed control unit 41, and a value of actual current. The slip frequency calculation unit 45 also generates a slip frequency estimated value, based on a magnetic flux command and a current command generated by a speed control unit 41, and a value of actual current. A difference between the primary frequency command and the slip frequency estimated value becomes an estimated speed. The speed deviation calculation unit 21 calculates a deviation between a speed command to the motor 3 and the estimated speed of the motor 3, and the speed control unit 41 generates, based on the deviation, a magnetic flux command and a current command. The two-phase-three-phase conversion unit 43 converts three-phase actual current of the inverter 12 into two-phase actual current. Based on the magnetic flux command, the current command, and the two-phase actual current, the current control unit 42 generates a two-phase voltage command. The two-phase-three-phase conversion unit 43 converts the two-phase voltage command into a three-phase voltage command, and outputs the three-phase voltage command to the inverter 12. The inverter 12 converts, based on the received three-phase voltage command, DC voltage (i.e., DC voltage in a DC link) input from a DC side into AC voltage for driving the motor 3 being an induction motor, and then outputs the AC voltage.

In the second embodiment, speed information of the motor 3 in the case of an induction motor is an estimated speed of the induction motor calculated based on a value of actual current flowing into the induction motor or a current command to the induction motor, and a primary frequency command to the induction motor. In the example illustrated in FIG. 5, the estimated speed calculation unit 32 of the induction motor acquires an estimated speed of the motor 3 being an induction motor, by taking a difference between the primary frequency command generated, by the primary frequency control unit 44, based on the current command and the value of the actual current, and the slip frequency estimated value generated, by the slip frequency calculation unit 45, based on the current command and the value of the actual current.

While the speed deviation calculation unit 21 calculates a deviation between a speed command to the motor 3 and an estimated speed of the motor 3, this deviation is used for both slip-frequency-control-type sensorless vector control of an induction motor by the inverter control unit 10 and boosting operation control by the boosting unit 13. The boosting start determination unit 22, the boosting control unit 23, and the boosting end determination unit 24 inside the boosting unit 13 are as has been described with reference to FIG. 1, and therefore, a description is omitted.

Figure 6:
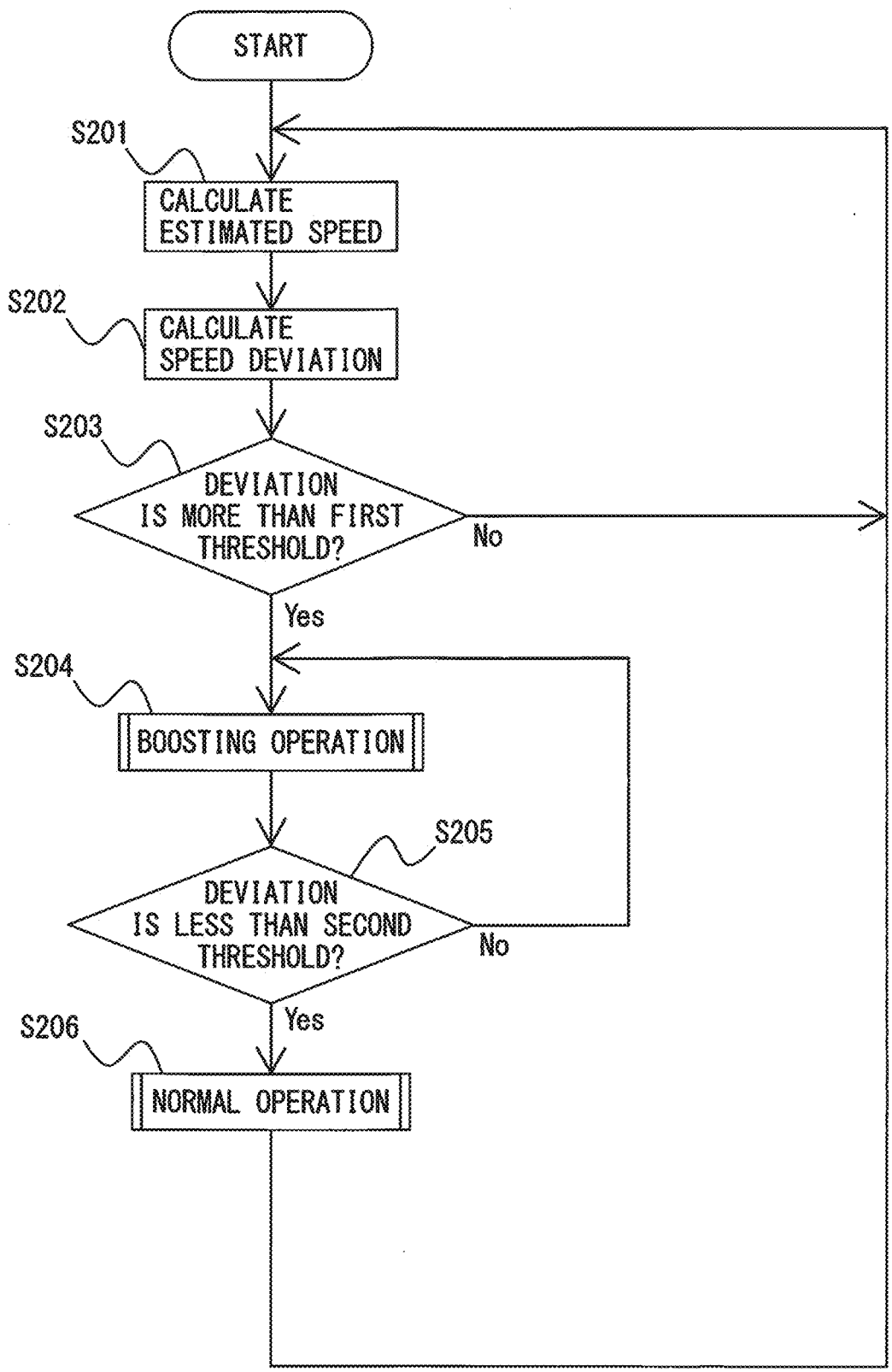
FIG. 6 is a flowchart illustrating an operation flow of the motor control apparatus according to the second embodiment of the present disclosure.

FIG. 6 is a flowchart illustrating an operation flow of the motor control apparatus according to the second embodiment of the present disclosure.

In a state where driving of the motor 3 is controlled by the motor control apparatus 1, the estimated speed calculation unit 32 calculates an estimated speed of the motor 3, in Step S201.

In Step S202, the speed deviation calculation unit 21 calculates a deviation between a speed command to the motor 3 and the estimated speed of the motor 3 calculated by the estimated speed calculation unit 32.

In Step S203, the boosting start determination unit 22 determines whether or not the deviation calculated by the speed deviation calculation unit 21 is more than a first threshold. The operation flow proceeds to Step S204 when it is determined in Step S203 that the deviation is more than the first threshold, whereas the operation flow returns to Step S201 when it is not determined that the deviation is more than the first threshold. The first threshold is as has been described in the first embodiment.

In Step S204, the boosting control unit 23 steps up DC voltage input to the inverter 12 from the DC side to DC voltage greater than that at the time before determined to be more than the first threshold by the boosting start determination unit 22.

In Step S205, the boosting end determination unit 24 determines whether or not the deviation calculated by the speed deviation calculation unit 21 is less than the second threshold. The operation flow proceeds to Step S206 when it is determined in Step S205 that the deviation is less than the second threshold, whereas the operation flow returns to Step S204 when it is not determined that the deviation is less than the second threshold. The second threshold is as has been described in the first embodiment.

In Step S206, the boosting control unit 23 steps down DC voltage input to the inverter 12 from the DC side to DC voltage at the time before determined to be more than the first threshold by the boosting start determination unit 22. Therefore, the DC voltage input to the inverter 12 returns to the value before boost.

Now, a circuit configuration of a motor control apparatus according to a third embodiment of the present disclosure is described. The third embodiment is a modification example of the second embodiment, and can be applied to an induction motor (sensorless induction motor) having no speed sensor, or a synchronous motor (sensorless synchronous motor) having no speed sensor.

Particularly, in the sensorless vector control of an induction motor, a divergence between an estimated speed and an actual speed may become great particularly during transition or during a high load, due to a motor circuit constant set value error, a limit of control performance of sensorless control, and the like. Thus, a speed control unit controls in such a way that an estimated speed of the induction motor coincides with a speed command, but there may arise a situation where the actual speed remains decreased. Thus, in the third embodiment, a proximity switch is provided in a motor or in a drive axis connected to the motor via a gear, a belt, or the like, and an actual speed of the motor is calculated, based on a pulse signal according to rotation of the motor output by the proximity switch or the drive axis connected to the motor, and used as speed information.

Figure 7:
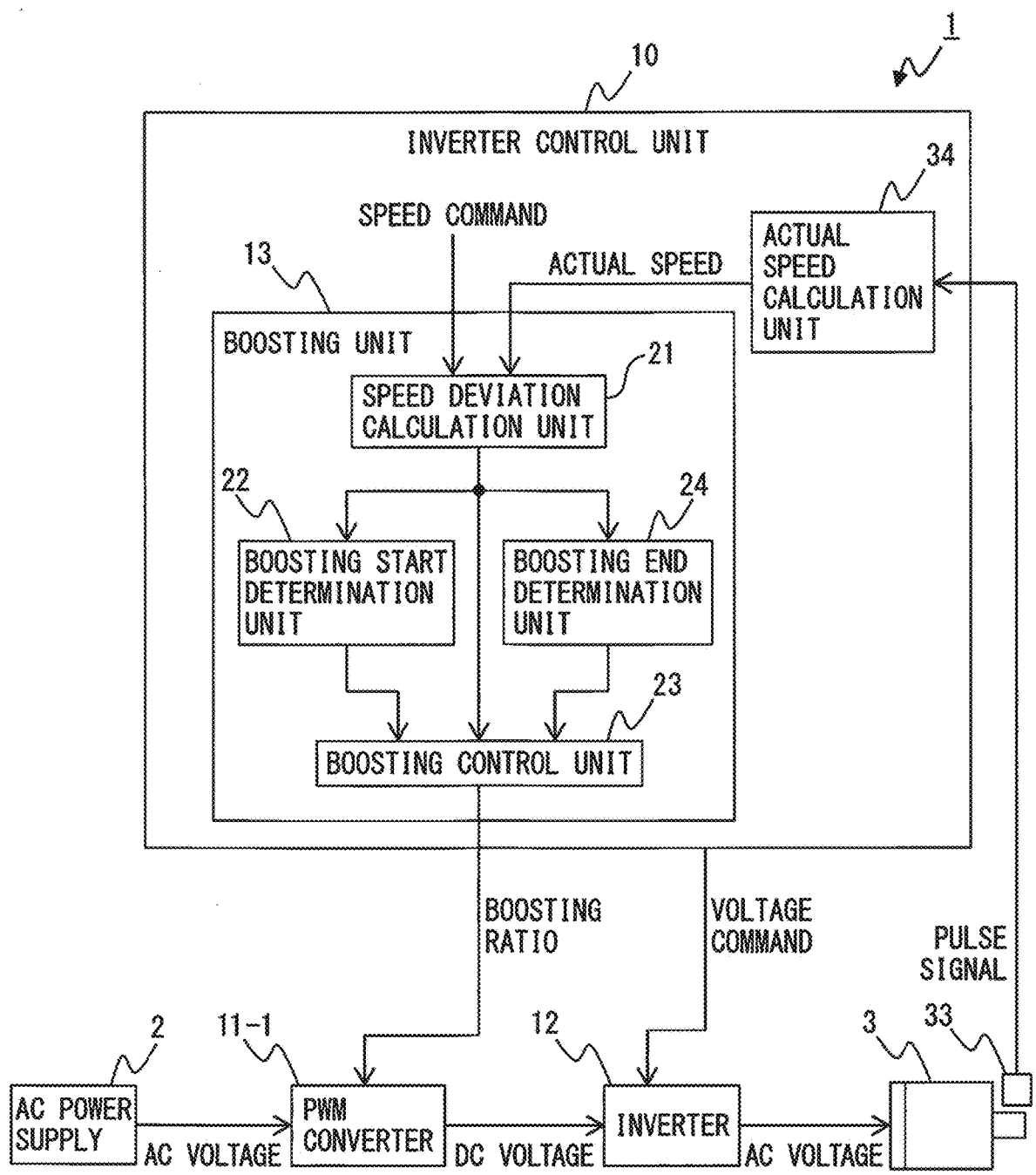
FIG. 7 is a diagram illustrating the motor control apparatus according to the second embodiment of the present disclosure.
Figure 8:
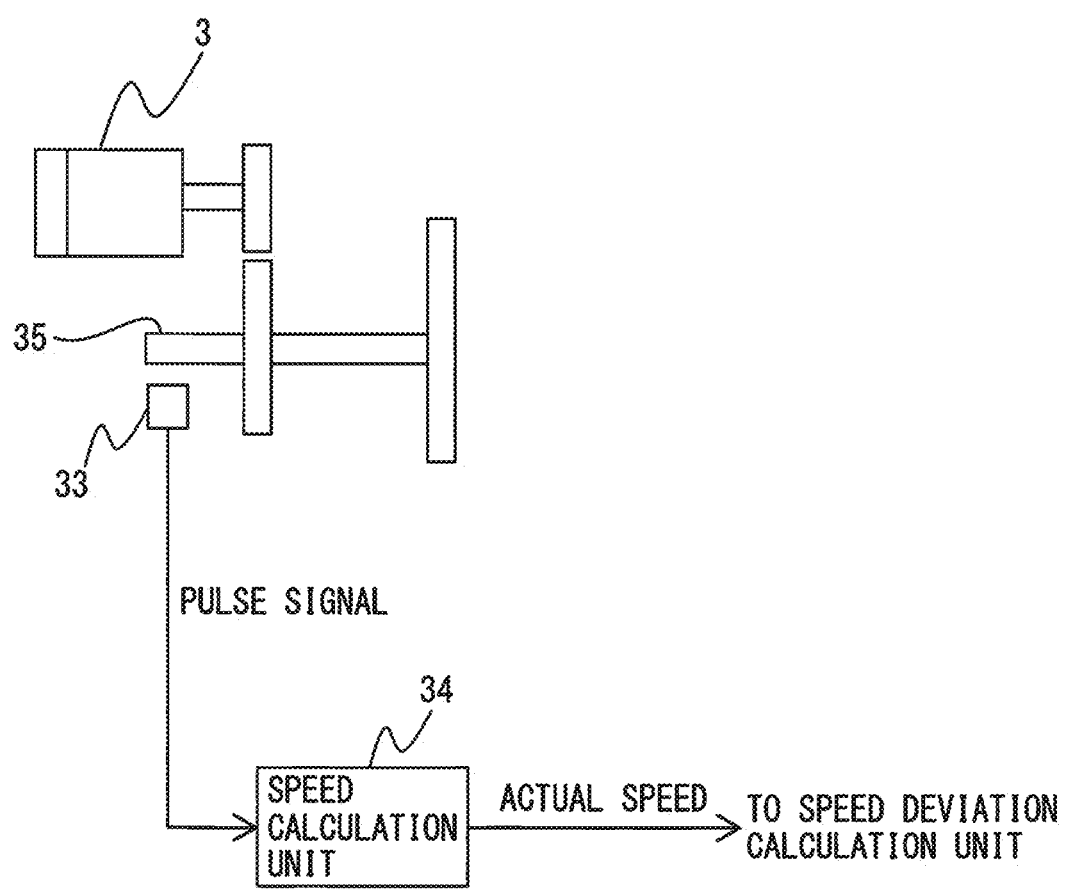
FIG. 8 is a diagram illustrating an example in which a proximity switch is disposed in the vicinity of a drive axis connected to an induction motor.

FIG. 7 is a diagram illustrating the motor control apparatus according to the second embodiment of the present disclosure. Moreover, FIG. 8 is a diagram illustrating an example in which a proximity switch is disposed in the vicinity of a drive axis connected to an induction motor. Further, FIG. 9 is a diagram illustrating details of an inverter control unit illustrated in FIG. 7, and one example when a sensorless induction motor is controlled.

As one example, a case where a motor 3 is controlled by a motor control apparatus 1 connected to an AC power supply 2 is described. The motor 3 may be either an induction motor or a synchronous motor. Note that the number of phases of each of the AC power supply 2 and the motor 3 does not particularly limit the present embodiment, and may be, for example, three phases or a single phase. A three-phase AC 400 V power supply, a three-phase AC 200 V power supply, a three-phase AC 600 V power supply, a single-phase AC 100 V power supply, or the like is cited as one example of the AC power supply 2. Herein, machines provided with the motor 3 include, e. g., a machine tool, a robot, forging machinery, an injection molding machine, industrial machinery, various electrical appliances, an electric train, an automobile, and an aircraft.

As illustrated in FIG. 7, the motor control apparatus 1 according to the present embodiment includes a PWM converter 11-1, an inverter 12, a boosting unit 13, a proximity switch 33, and an actual speed calculation unit 34.

Figure 9:
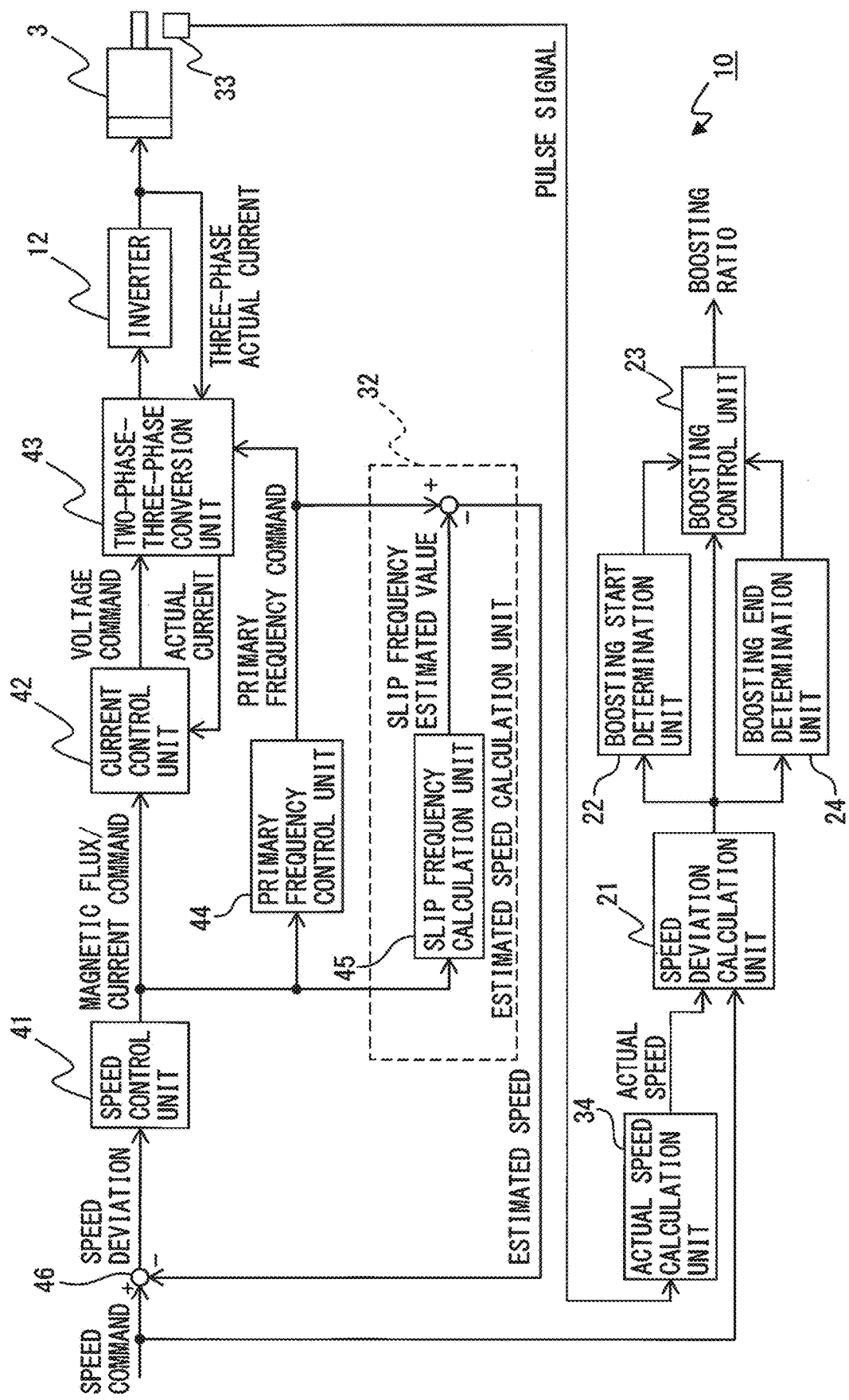
FIG. 9 is a diagram illustrating details of an inverter control unit illustrated in FIG. 7, and one example when a sensorless induction motor is controlled.

As illustrated in FIGS. 7 and 9, the actual speed calculation unit 34 is provided in, for example, an inverter control unit 10. The actual speed calculation unit 34 may be built, for example, in a form of a software program, or may be built by a combination of various electronic circuits and a software program. For example, when the actual speed calculation unit 34 is built in a form of a software program, a function of each of the above-described units may be implemented by causing an arithmetic processing device such as a DSP or an FPGA provided inside the inverter control unit 10 in the motor control apparatus 1 to operate in accordance with the software program. Alternatively, the actual speed calculation unit 34 may be implemented as a semiconductor integrated circuit on which a software program implementing a function of each unit is written.

Note that the actual speed calculation unit 34 may be provided separately from the inverter control unit 10, or may be provided inside, for example, a numerical control apparatus 100 of a machine tool.

Herein, the PWM converter 11-1 and the inverter 12 are as has been described with reference to FIG. 1, and therefore, a description is omitted. Note that the boosting unit 13 is provided inside the inverter control unit 10 in FIGS. 7 and 9, but may be provided separately from the inverter control unit 10, or may be provided inside, for example, a numerical control apparatus 100 of a machine tool.

As in a general motor control apparatus, the motor control apparatus 1 includes the inverter control unit 10. As described above, the inverter control unit 10 may be built, for example, in a form of a software program, or may be built by a combination of various electronic circuits and a software program. As illustrated in FIG. 9, in order to perform sensorless vector control of the motor 3 being an induction motor, the inverter control unit 10 includes a speed deviation calculation unit 21, a speed control unit 41, a current control unit 42, a two-phase-three-phase conversion unit 43, a primary frequency control unit 44, and a slip frequency calculation unit 45. The speed deviation calculation unit 21 in sensorless vector control is also used as a speed deviation calculation unit inside the boosting unit 13 in the present embodiment. Moreover, the slip frequency calculation unit 45 in sensorless vector control is also used as part of a function of the estimated speed calculation unit 32 inside the boosting unit 13 in the present embodiment. The above-described configuration of the inverter control unit 10 according to slip-frequency-control-type sensorless vector control of an induction motor is as has been described with reference to FIGS. 4 and 5, and therefore, a description is omitted.

The proximity switch 33 is disposed at a position where rotation of the motor 3 can be detected, for example, in the vicinity of a rotation shaft of the motor 3. Alternatively, as illustrated in FIG. 8, the proximity switch 33 may be disposed at a position where rotation of a drive axis 35 connected to the motor 3 via a gear, a belt, or the like can be detected, for example, in the vicinity of a rotation shaft of the drive axis 35.

The proximity switch 33 outputs a pulse signal according to rotation of the motor 3 or the drive axis connected to the motor 3. The proximity switch 33 is different from a speed sensor such as a rotary encoder. The speed sensor can output an A-phase output signal and a B-phase output signal, and detect a rotation direction, a rotation position (rotation angle), and a rotation speed of a rotor such as (a rotation shaft of) a motor in high accuracy and high speed. In contrast, the proximity switch 33 is disposed in the vicinity of a rotor, and outputs one pulse of one time of on/off or N pulses (however, N is an integer) of N times of on/off per rotation of the rotor by detecting a portion to be detected provided on a rotation direction surface portion of the rotor. The number of rotations of the rotor can be detected by monitoring a pulse signal output by the proximity switch 33. Moreover, a rotation speed of the rotor can be detected by calculation from the number of pulses in a predetermined period of a pulse signal output by the proximity switch 33. However, in order to acquire a rotation speed from a pulse signal output by the proximity switch 33, the number of pulses needs to be counted at divided times, averaging processing needs to be performed at the time intervals, and therefore, it takes time to acquire a rotation speed as compared with the speed sensor. In addition, a rotation direction or a rotation position (rotation angle) of a rotor may not be detected by the proximity switch 33.

In this way, the proximity switch 33 requires time to acquire a rotation speed, but is capable of acquisition of a rotation speed as such. For example, a proximity switch is often disposed on a drive axis of a machine tool. Thus, in the third embodiment, an actual speed of the motor 3 is calculated by the actual speed calculation unit 34, based on a pulse signal output by the proximity switch 33 provided in the vicinity of the motor 3 or the drive axis connected to the motor 3, and used as speed information. The speed deviation calculation unit 21 calculates a deviation between a speed command to the motor 3 and a speed of the motor 3 calculated by the actual speed calculation unit 34. The boosting start determination unit 22, the boosting control unit 23, and the boosting end determination unit 24 inside the boosting unit 13 are as has been described with reference to FIG. 1, and therefore, a description is omitted.

Figure 10:
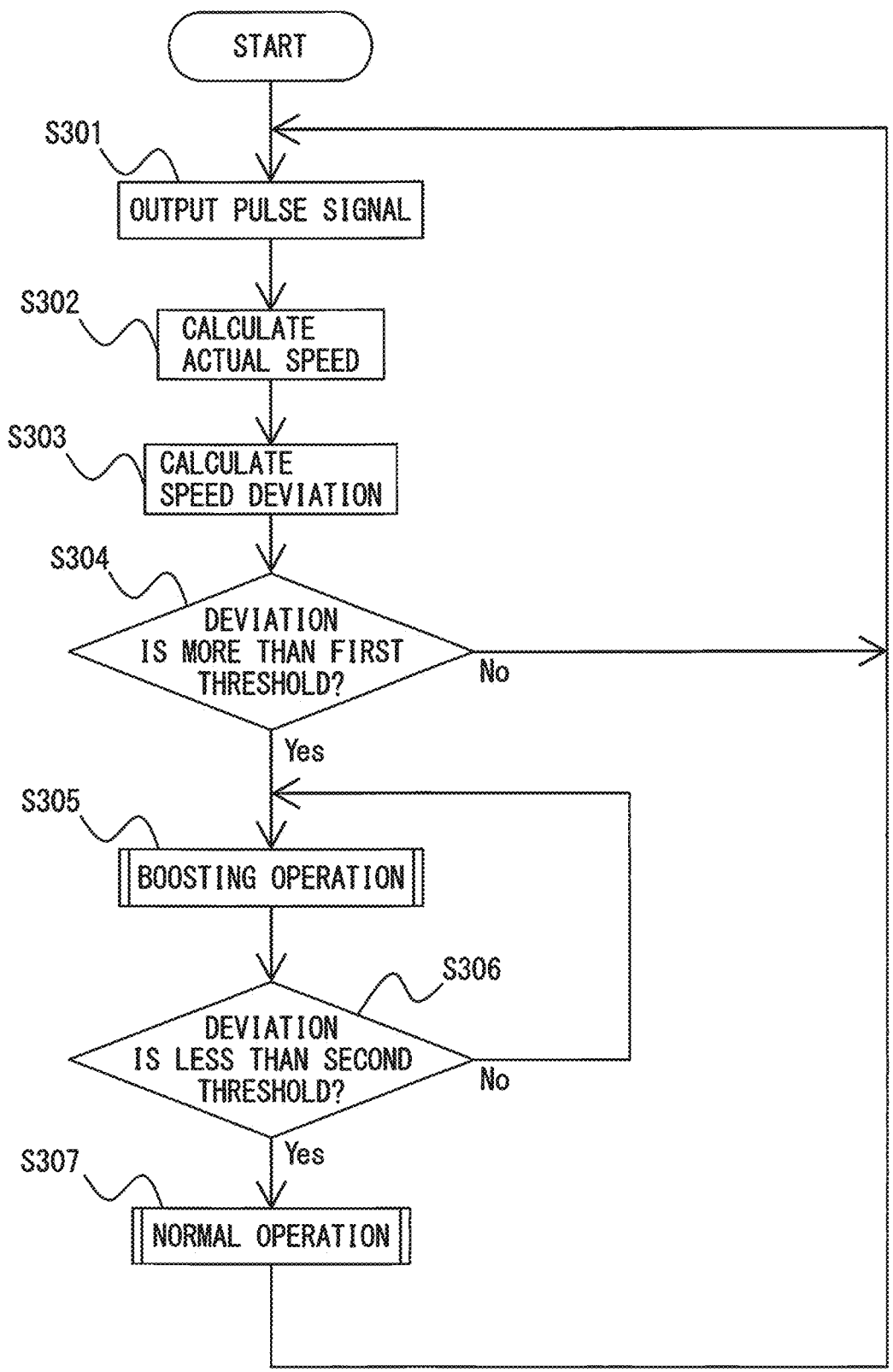
FIG. 10 is a flowchart illustrating an operation flow of a motor control apparatus according to a third embodiment of the present disclosure.

FIG. 10 is a flowchart illustrating an operation flow of a motor control apparatus according to a third embodiment of the present disclosure.

In a state where driving of the motor 3 being an induction motor is controlled by the motor control apparatus 1, the proximity switch 33 outputs a pulse signal according to rotation of the motor 3 or the drive axis connected to the motor 3, in Step S301.

In Step S302, the actual speed calculation unit 34 calculates, based on a pulse signal output from the proximity switch 33, an actual speed of the motor 3 as speed information.

In Step S303, the speed deviation calculation unit 21 calculates a deviation between a speed command to the motor 3 and the estimated speed of the motor 3 calculated by the estimated speed calculation unit 32.

In Step S304, the boosting start determination unit 22 determines whether or not the deviation calculated by the speed deviation calculation unit 21 is more than a first threshold. The operation flow proceeds to Step S305 when it is determined in Step S304 that the deviation is more than the first threshold, whereas the operation flow returns to Step S301 when it is not determined that the deviation is more than the first threshold. The first threshold is as has been described in the first embodiment.

In Step S305, the boosting control unit 23 steps up DC voltage input to the inverter 12 from a DC side to DC voltage greater than that at the time before determined to be more than the first threshold by the boosting start determination unit 22.

In Step S306, the boosting end determination unit 24 determines whether or not the deviation calculated by the speed deviation calculation unit 21 is less than the second threshold. The operation flow proceeds to Step S307 when it is determined in Step S306 that the deviation is less than the second threshold, whereas the operation flow returns to Step S305 when it is not determined that the deviation is less than the second threshold. The second threshold is as has been described in the first embodiment.

In Step S307, the boosting control unit 23 steps down DC voltage input to the inverter 12 from the DC side to DC voltage at the time before determined to be more than the first threshold by the boosting start determination unit 22. Therefore, the DC voltage input to the inverter 12 returns to the value before boost.

Now, a relation between a deviation between a speed command and an actual speed, and a boosting ratio during a boosting operation in the motor control apparatus 1 according to the first to third embodiments, and a relation between a deviation and a threshold are described in more detail.

As described above, the boosting unit 13 steps up DC voltage input to the inverter 12 from the DC link being the DC side, according to a deviation between a speed command to the motor 3 and speed information acquired from the motor 3. The boosting start determination unit 22 inside the boosting unit 13 determines whether or not the deviation between the speed command to the motor 3 and the speed information acquired from the motor 3 is more than the prescribed first threshold. When the deviation calculated by the speed deviation calculation unit 21 is more than the first threshold as a result of the determination by the boosting start determination unit 22, the boosting control unit 23 steps up DC voltage input to the inverter 12 from the DC side to DC voltage greater than that at the time before determined to be more than the first threshold by the boosting start determination unit 22. Some examples of a boosting operation by the boosting control unit 23 when a deviation calculated by the speed deviation calculation unit 21 is more than the first threshold are cited.

Figure 11:
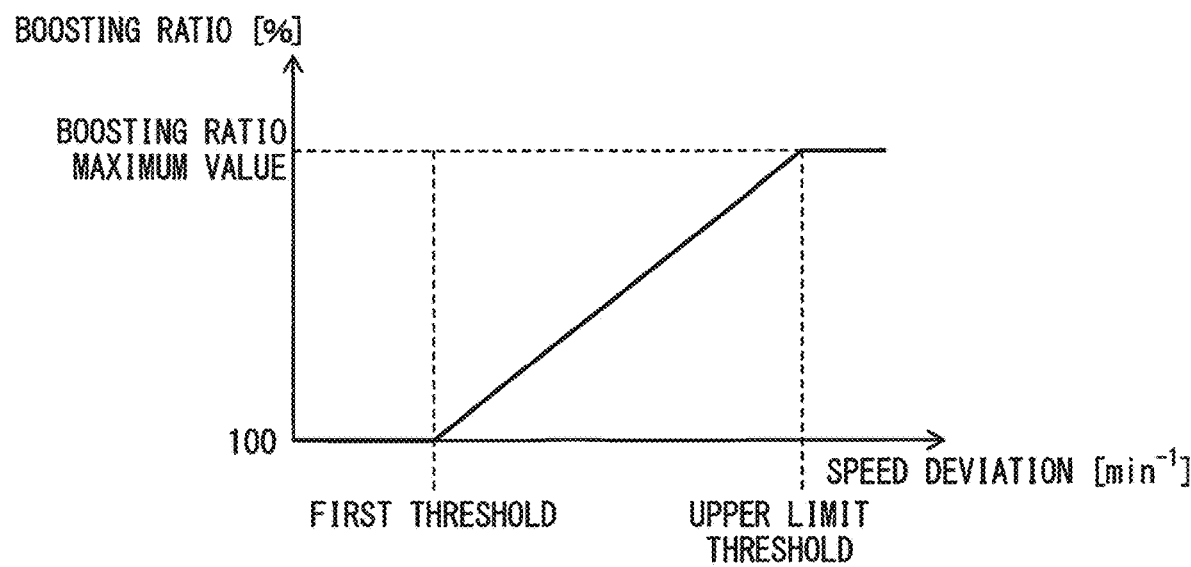
FIG. 11 is a graph exemplifying a relation between a speed deviation and a boosting ratio by a boosting operation according to a first example in the first to third embodiments of the present disclosure.

FIG. 11 is a graph exemplifying a relation between a speed deviation and a boosting ratio by a boosting operation according to a first example in the first to third embodiments of the present disclosure. In the first example of the boosting operation by the boosting control unit 23, the boosting control unit 23 steps up DC voltage input to the inverter 12 from the DC side in proportion to a deviation calculated by the speed deviation calculation unit 21. When a deviation (speed deviation) between a speed command to the motor 3 and speed information acquired from the motor 3 is less than the first threshold, the boosting unit 13 does not perform a boosting operation, and the PWM converter 11-1 converts AC voltage input from the AC power supply 2 side into prescribed DC voltage, and then outputs the DC voltage. A boosting ratio associated with DC voltage output from the PWM converter 11-1 when the boosting unit 13 does not perform a boosting operation is 100%. While a maximum value of DC voltage that can be output is generally prescribed in the PWM converter 11-1, a boosting ratio associated with a maximum value of DC voltage output from the PWM converter 11-1 is referred to as a "boosting ratio maximum value". When a deviation between a speed command to the motor 3 and speed information acquired from the motor 3 is more than the first threshold, the boosting ratio is raised in proportion to the speed deviation. However, from the viewpoint of protection of the PWM converter 11-1, a speed deviation associated with the boosting ratio maximum value is prescribed as an "upper limit threshold", and the boosting ratio is kept at the boosting ratio maximum value when a deviation between a speed command to the motor 3 and speed information acquired from the motor 3 is more than the upper limit threshold. In a boosting operation according to the first example, the boosting control unit 23 informs the PWM converter 11-1 of a boosting ratio satisfying a relation illustrated in FIG. 11, and, based on this, the PWM converter 11-1 performs a boosting operation, based on a boosting ratio proportional to a speed deviation, when a deviation between a speed command to the motor 3 and speed information acquired from the motor 3 is more than the first threshold. Note that, a boosting ratio when a deviation between a speed command to the motor 3 and speed information acquired from the motor 3 is more than the first threshold may be calculated each time, based on a speed deviation calculated by the speed deviation calculation unit 21. Alternatively, a boosting ratio associated with a speed deviation calculated by the speed deviation calculation unit 21 may be read from a relation between a speed deviation and a boosting ratio pre-stored in a storage unit (not illustrated).

Figure 12:
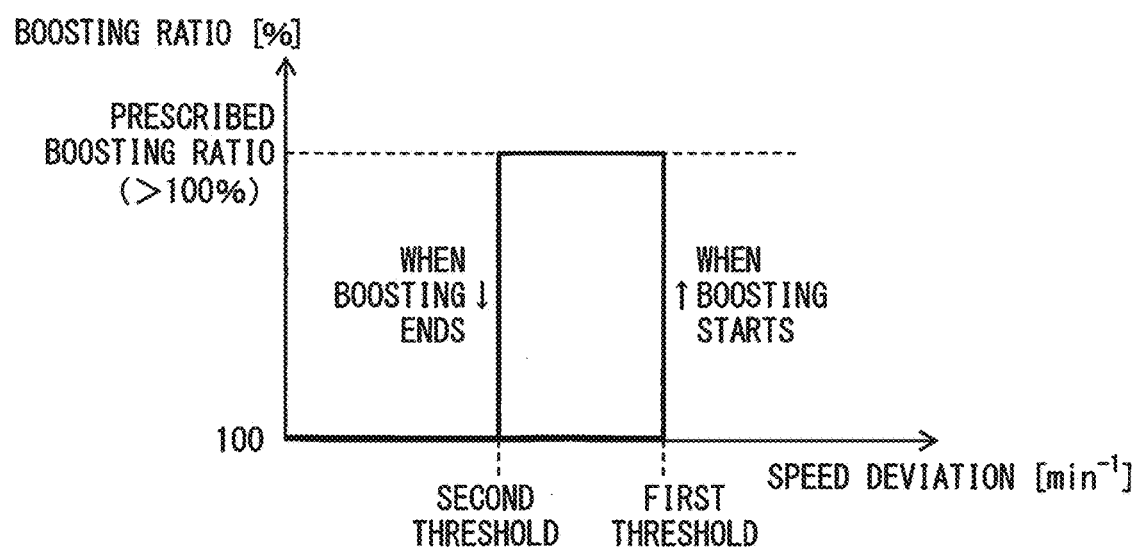
FIG. 12 is a graph exemplifying a relation between a speed deviation and a boosting ratio by a boosting operation according to a second example in the first to third embodiments of the present disclosure.

FIG. 12 is a graph exemplifying a relation between a speed deviation and a boosting ratio by a boosting operation according to a second example in the first to third embodiments of the present disclosure. In the second example as well as in the first example, a boosting ratio associated with DC voltage output from the PWM converter 11-1 when the boosting unit 13 does not perform a boosting operation is 100%. In the second example of the boosting operation by the boosting control unit 23, when the boosting start determination unit 22 determines that a deviation between a speed command to the motor 3 and speed information acquired from the motor 3 is more than the first threshold, the boosting control unit 23 increases, in stepwise, a boosting ratio to a constant boosting ratio (hereinafter, referred to as a "prescribed boosting ratio") prescribed as a value greater than 100%. When the boosting end determination unit 24 determines that a deviation calculated by the speed deviation calculation unit 21 is less than the prescribed second threshold smaller than the first threshold after determined to be more than the first threshold by the boosting start determination unit 22, the boosting control unit 23 decreases, in stepwise, the boosting ratio to 100% from the prescribed boosting ratio.

In the first to third embodiments described above, the boosting unit 13 steps up DC voltage output from the DC side of the PWM converter 11-1 and then input to the inverter 12, by controlling a switching operation of the semiconductor switching element inside the PWM converter 11-1. Now, some modification examples of the boosting unit 13 are cited.

Figure 13:
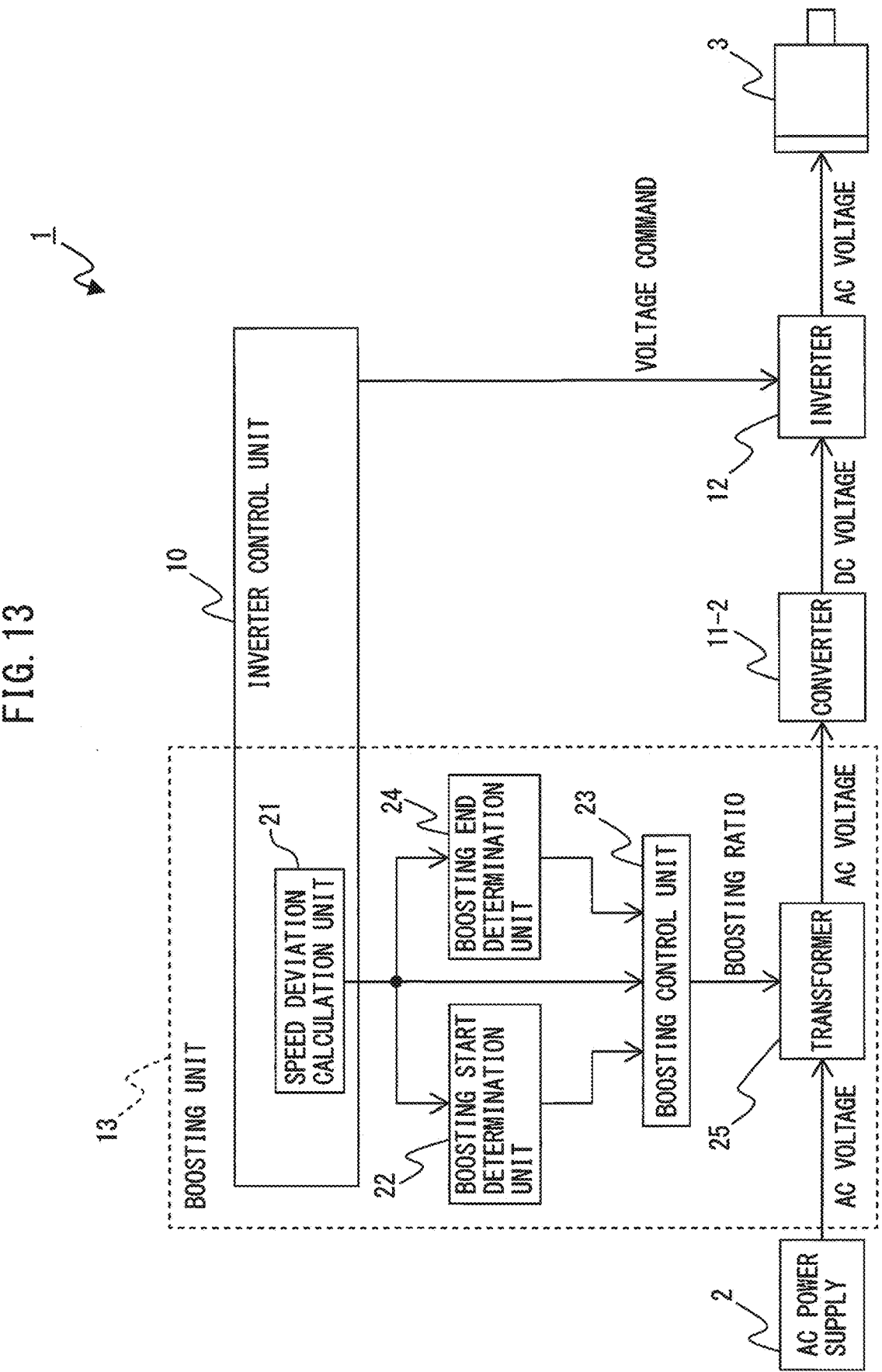
FIG. 13 is a diagram illustrating a first modification example of the boosting unit in the first to third embodiments of the present disclosure.

In a first modification example of the boosting unit 13, a voltage-transformation-ratio-variable transformer is provided between an AC power supply and a converter, and DC voltage input to an inverter from the converter is stepped up by stepping up AC voltage input to the converter by the transformer. FIG. 13 is a diagram illustrating a first modification example of the boosting unit according to the first to third embodiments of the present disclosure. As illustrated in FIG. 13, the boosting unit 13 further includes a voltage-transformation-ratio-variable transformer 25 provided between the AC power supply 2 and a converter 11-2. The boosting unit 13 can step up AC voltage input to the converter 11-2, by controlling a voltage transformation ratio of the transformer 25. In other words, when the boosting start determination unit 22 determines that a deviation between a speed command to the motor 3 and speed information acquired from the motor 3 is more than the first threshold, the boosting control unit 23 inside the boosting unit 13 informs the transformer 25 of a boosting ratio for a boosting operation, and the transformer 25 changes a voltage transformation ratio according to the boosting ratio informed of. Thus, AC voltage input to the converter 11-2 is stepped up, and as a result, DC voltage output from the converter 11-2 is also stepped up. In other words, DC voltage input to the inverter 12 is also stepped up. Thereafter, when the boosting end determination unit 24 determines that the deviation between the speed command to the motor 3 and the speed information acquired from the motor 3 is less than the second threshold, the boosting control unit 23 inside the boosting unit 13 informs the transformer 25 of a boosting ratio (i.e., 100% in the examples of FIGS. 11 and 12) when a boosting operation is not performed, and the transformer 25 changes a voltage transformation ratio according to the boosting ratio informed of. Thus, AC voltage input to the converter 11-2 is stepped down, and as a result, DC voltage output from the converter 11-2 is also stepped down. In other words, DC voltage input to the inverter 12 returns to a value before boost.

According to the first modification example of the boosting unit 13, DC voltage input to the inverter 12 is stepped up and down by controlling a voltage transformation ratio of the transformer 25, and therefore, the converter 11-2 does not need to be a converter of the PWM control method, and may be a diode rectification circuit.

Figure 14:
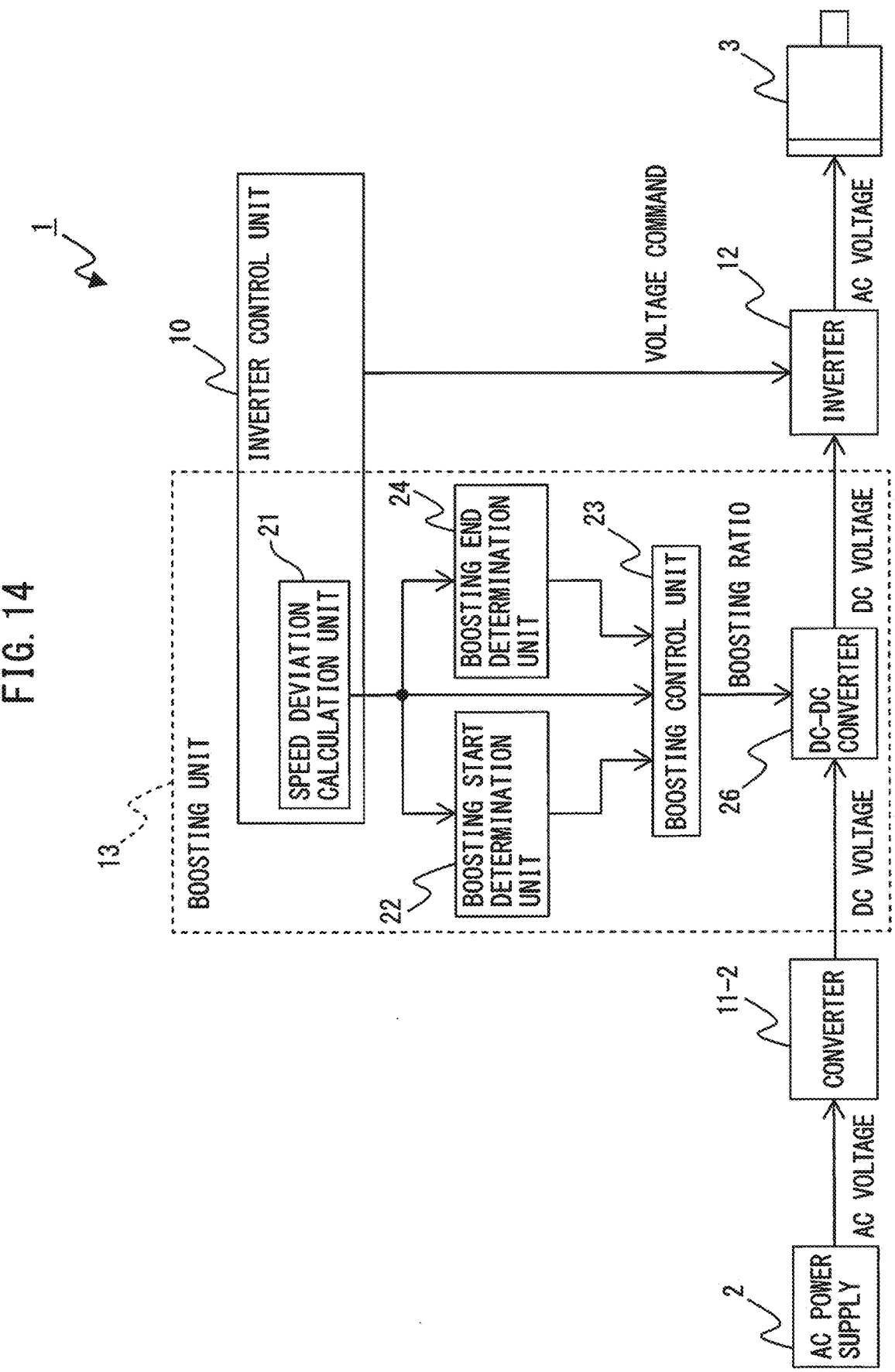
FIG. 14 is a diagram illustrating a second modification example of the boosting unit in the first to third embodiments of the present disclosure.
Figure 15:
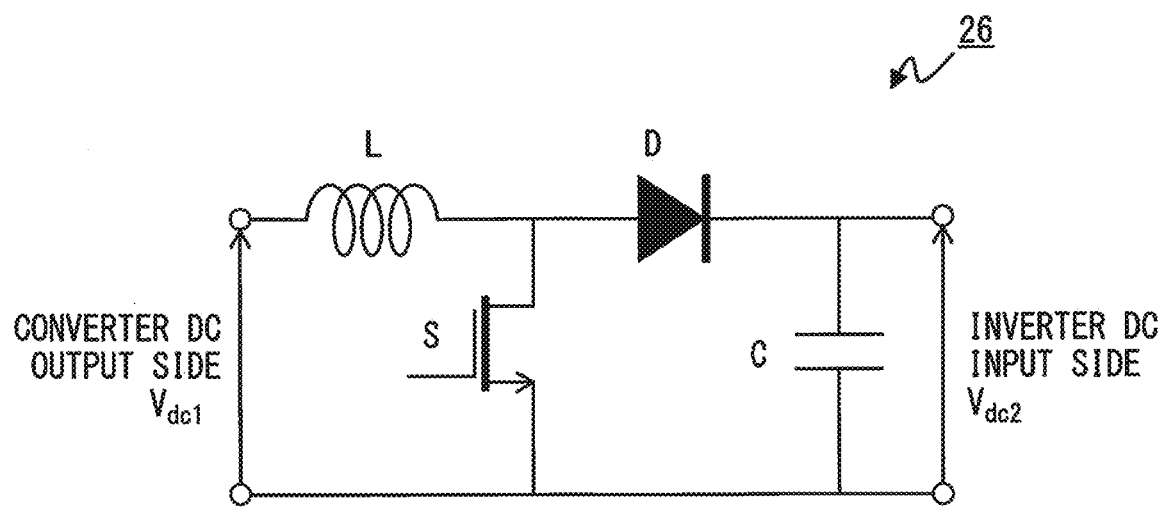
FIG. 15 is a circuit diagram illustrating a step-up chopper circuit.

In a second modification example of the boosting unit 13, a DC-DC converter being capable of changing intensity of DC voltage is provided between a converter and an inverter, and DC voltage input to an inverter is stepped up by stepping up DC voltage output from the converter by the DC-DC converter. FIG. 14 is a diagram illustrating the second modification example of the boosting unit according to the first to third embodiments of the present disclosure. FIG. 15 is a circuit diagram illustrating a step-up chopper circuit. As illustrated in FIG. 14, the boosting unit 13 further includes a DC-DC converter 26 provided between the converter 11-2 and the inverter 12. The DC-DC converter 26 is configured by, for example, a step-up chopper circuit as illustrated in FIG. 15. As an alternative example of this, the DC-DC converter 26 may be configured by use of a switching regulator. The boosting unit 13 can step up DC voltage output from the converter 11-2, by controlling the DC-DC converter 26. In other words, when the boosting start determination unit 22 determines that a deviation between a speed command to the motor 3 and speed information acquired from the motor 3 is more than the first threshold, the boosting control unit 23 inside the boosting unit 13 informs the DC-DC converter 26 of a boosting ratio for a boosting operation, and the DC-DC converter 26 steps up DC voltage output from the converter 11-2 according to the boosting ratio informed of. As a result, DC voltage input to the inverter 12 is also stepped up. Thereafter, when the boosting end determination unit 24 determines that the deviation between the speed command to the motor 3 and the speed information acquired from the motor 3 is less than the second threshold, the boosting control unit 23 inside the boosting unit 13 informs the DC-DC converter 26 of a boosting ratio (i.e., 100% in the examples of FIGS. 11 and 12) when a boosting operation is not performed, and the DC-DC converter 26 outputs DC voltage output from the converter 11-2 without stepping up the DC voltage. Thus, DC voltage input to the inverter 12 returns to a value before boost. According to the second modification example of the boosting unit 13, DC voltage input to the inverter 12 is stepped up and down by controlling a voltage conversion operation of the DC-DC converter 26, and therefore, the converter 11-2 does not need to be a converter of the PWM control method, and may be a diode rectification circuit.

For example, in the case of a cylindrical grinder provided with a motor control apparatus which controls a sensorless induction motor, a wheel spindle is accelerated before start of processing, and grinding is conducted from a point where a constant number of rotations is reached. When a feed speed of the wheel spindle is increased, a load on the induction motor may increase, and a speed of the wheel spindle may decrease due to shortage of torque. According to the second or third embodiment, DC voltage input to an inverter is stepped up at such a speed decrease of the induction motor during processing, AC voltage output from the inverter is stepped up accordingly, torque of the induction motor improves, and therefore, a decrease in the speed of the wheel spindle can be avoided.

According to one aspect of the present disclosure, it is possible to achieve a motor control apparatus being capable of avoiding a decrease in the speed of a motor resulting from unexpected decreases in motor output and torque.

The invention claimed is:

1. A motor control apparatus, comprising:
a converter configured to convert AC voltage input from an AC power supply side into DC voltage, and then output the DC voltage to a DC side;
an inverter configured to convert DC voltage input from the DC side into AC voltage for driving a motor, and then output the AC voltage; and
a boosting unit configured to step up DC voltage input to the inverter from the DC side, according to a deviation between a speed command to the motor and speed information acquired from the motor,
wherein the boosting unit includes
a speed deviation calculation unit configured to calculate the deviation between a speed command to the motor and speed information acquired from the motor,
a boosting start determination unit configured to determine whether or not the deviation calculated by the speed deviation calculation unit is more than a prescribed first threshold,
a boosting control unit configured to step up DC voltage input to the inverter from the DC side to DC voltage greater than that at a time before determined to be more than the first threshold by the boosting start determination unit, when the deviation calculated by the speed deviation calculation unit is more than the first threshold as a result of the determination by the boosting start determination unit, and
a boosting end determination unit configured to determine whether or not the deviation calculated by the speed deviation calculation unit is less than a prescribed second threshold smaller than the first threshold after the boosting start determination unit determines that the deviation is more than the first threshold, and
in response to the deviation calculated by the speed deviation calculation unit being less than the second threshold as a result of the determination by the boosting end determination unit, the boosting control unit is configured to step down DC voltage input to the inverter from the DC side to DC voltage at a time before the boosting start determination unit determines that the deviation is more than the first threshold.

2. The motor control apparatus according to claim 1, further comprising a speed sensor configured to detect an actual speed of the motor as the speed information.

3. The motor control apparatus according to claim 1, further comprising
an estimated speed calculation unit configured to calculate, based on a value of actual current flowing into the motor being an induction motor or a current command to the induction motor, and a primary frequency command to the induction motor, an estimated speed of the induction motor as the speed information.

4. The motor control apparatus according to claim 1, further comprising:
a proximity switch configured to output a pulse signal according to rotation of the motor or a drive axis connected to the motor; and
an actual speed calculation unit configured to calculate, based on a pulse signal output from the proximity switch, an actual speed of the motor as the speed information.

5. The motor control apparatus according to claim 1, wherein
the converter is a PWM converter configured to convert AC voltage input from an AC power supply side into desired intensity of DC voltage by a switching operation of an internal semiconductor switching element, and then outputs the DC voltage to a DC side, and
the boosting unit is configured to step up DC voltage output from the DC side of the PWM converter and then input to the inverter, by controlling a switching operation of the semiconductor switching element inside the PWM converter.

6. The motor control apparatus according to claim 1, wherein
the boosting unit further includes a transformer provided between the AC power supply and the converter, and
the boosting unit is configured to step up AC voltage input to the converter by controlling a voltage transformation ratio of the transformer to boost DC voltage output from the DC side of the converter and then input to the inverter.

7. The motor control apparatus according to claim 1, wherein
the boosting unit further includes a DC-DC converter provided between the converter and the inverter, and
the boosting unit is configured to step up DC voltage output from the DC side of the converter by controlling the DC-DC converter to boost DC voltage input to the inverter.

8. The motor control apparatus according to claim 1, wherein
the boosting unit is configured to step up DC voltage input to the inverter from the DC side, according to a deviation between a speed command to the motor and speed information acquired from the motor, when the speed command to the motor is neither an acceleration command nor a deceleration command.

9. The motor control apparatus according to claim 6, wherein
the boosting control unit is configured to provide a boosting ratio for a boosting operation to the transformer to change a voltage transformation ratio of the transformer according to the boosting ratio.

* * * * *